(12) United States Patent
Gehret et al.

(10) Patent No.: US 7,491,020 B2
(45) Date of Patent: Feb. 17, 2009

(54) THREE POSITION SELECTOR FOR AUTOMATED CHUCK

(75) Inventors: Robert S. Gehret, Hampstead, MD (US); Daniel Puzio, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 541 days.

(21) Appl. No.: 11/355,376

(22) Filed: Feb. 16, 2006

(65) Prior Publication Data

US 2006/0188350 A1  Aug. 24, 2006

Related U.S. Application Data

(60) Provisional application No. 60/654,846, filed on Feb. 18, 2005.

(51) Int. Cl.
*B23B 31/167* (2006.01)

(52) U.S. Cl. .................. 408/240; 279/62; 279/134; 279/140

(58) Field of Classification Search .............. 408/240; 279/60–62, 134, 135, 140
See application file for complete search history.

(56) References Cited

U.S. PATENT DOCUMENTS

| 4,395,170 | A | * | 7/1983 | Clarey | ................... | 408/241 R |
|---|---|---|---|---|---|---|
| 4,669,932 | A | * | 6/1987 | Hartley | ................... | 408/239 R |
| 5,072,954 | A | | 12/1991 | Mack | | |
| 5,195,760 | A | * | 3/1993 | Wheeler et al. | ................ | 279/60 |
| 5,988,653 | A | | 11/1999 | Kuo | | |
| 5,992,859 | A | | 11/1999 | Lin | | |
| 6,247,706 | B1 | | 6/2001 | Kuo | | |
| 6,257,596 | B1 | | 7/2001 | Yang | | |
| 6,488,286 | B2 | | 12/2002 | Yaksich | | |
| 6,517,295 | B2 | | 2/2003 | Lin | | |
| 6,536,536 | B1 | * | 3/2003 | Gass et al. | ..................... | 173/2 |
| 6,729,812 | B2 | | 5/2004 | Yaksich et al. | | |
| 6,874,585 | B2 | * | 4/2005 | Zhao | ........................... | 173/48 |
| 2002/0020972 | A1 | | 2/2002 | Yaksich | | |
| 2006/0185870 | A1 | * | 8/2006 | Gehret et al. | ................ | 173/217 |
| 2006/0186610 | A1 | * | 8/2006 | Puzio | ........................ | 279/62 |
| 2006/0186611 | A1 | * | 8/2006 | Gehret et al. | ................ | 279/62 |
| 2006/0186613 | A1 | * | 8/2006 | Campbell et al. | ............ | 279/62 |
| 2006/0232022 | A1 | * | 10/2006 | Nickels et al. | ................ | 279/60 |
| 2006/0244224 | A1 | * | 11/2006 | Zhou et al. | ..................... | 279/62 |

* cited by examiner

*Primary Examiner*—David P Bryant
*Assistant Examiner*—Eric A Gates
(74) *Attorney, Agent, or Firm*—Harness, Dickey & Pierce, P.L.C.

(57) ABSTRACT

A automated chuck is provided with at least three user selectable operating modes, thereby enabling different functions to be performed during tightening and loosening of the chuck. In one exemplary implementation, the different user selectable operating modes of the chuck may be used to actuate a motor direction switch of the drill.

9 Claims, 8 Drawing Sheets

THREE POSITION SELECTOR FOR AUTOMATED CHUCK

CROSS-REFERENCE TO RELATED APPLICATIONS

This application claims the benefit of U.S. Provisional Application No. 60/654,846, filed on Feb. 18, 2005. The disclosure of the above application is incorporated herein by reference.

FIELD OF THE INVENTION

The present invention relates in general to a chuck for use on a spindle and, more particularly, to a automated chuck having at least three user selectable operating modes.

BACKGROUND OF THE INVENTION

Automated chucks have recently been introduced into the marketplace. Such chucks typically employ only two user selectable operating modes: a chuck mode and a drill mode. In the chuck mode, actuation of the drill motor drives the chuck jaws together or apart depending on the motor direction, thereby tightening or loosening a drill bit placed between the jaws. In the drill mode, the chuck jaws remain tightened and a secured drill bit rotates in the operational direction of the motor.

In the context of a drill having a variable speed motor, the chuck jaws may be tightened at a very high speed which makes the grip on a bit in the chuck very tight. However, the operator may attempt to loosen the chuck at a lower speed. In this instance, the chuck may not loosen. Therefore, it is desirable to provide an improved chuck assembly having at least three user selectable operating modes, thereby enabling different functions to be performed during tightening and loosening of the chuck.

SUMMARY OF THE INVENTION

In accordance with one aspect of the present invention, an automated chuck is provided with at least three user selectable operating modes, thereby enabling different functions to be performed during tightening and loosening of the chuck. In one exemplary embodiment, the different user selectable operating modes of the chuck may be used to actuate a motor direction switch of the drill.

In another aspect of the present invention, a sightline window may be formed in the chuck housing to provide the user feedback regarding the position of the chuck jaws.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

Figure 1:
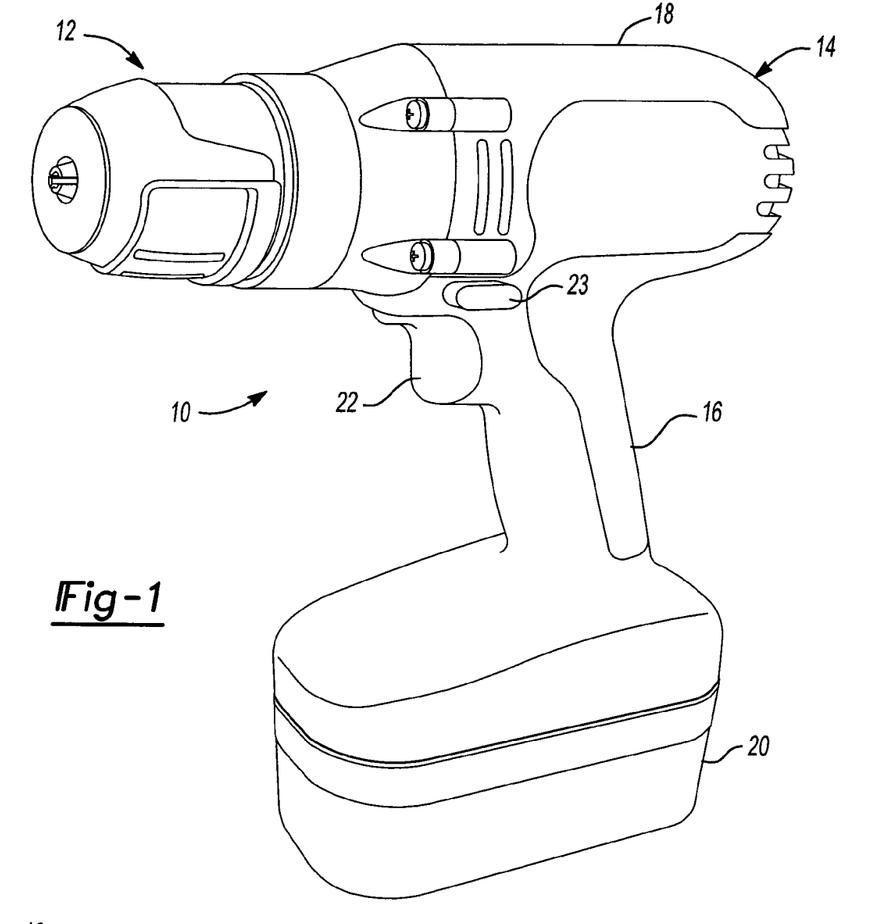
FIG. 1 is a perspective view of a drill incorporating an automated chuck according to the principles of the present invention.

FIG. 1 illustrates a automated chuck 12 in the context of a power drill 10. The drill 10 is comprised of a housing 14 including a handle portion 16 and body portion 18. A battery pack 20 is releasably attached to the handle portion 16. A trigger 22 is provided on the handle 16 for selectively providing electric current from the battery pack 20 to a motor provided within the body portion 18 of the housing 14. A motor direction switch 23 may also be provided on the handle 16 for selectively controlling the rotational direction of the motor. The motor is drivably coupled to a spindle which is in turn connected to the automated chuck 12. Although shown in the context of a drill, it is readily understood that the automated chuck 12 is configured for use with a rotatable spindle and thus may be used with other types of power driven tools.

Figure 2:
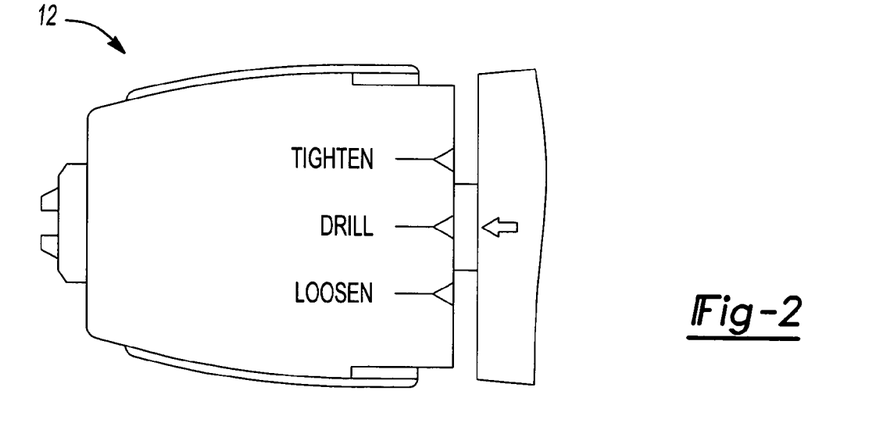
FIG. 2 is top view of an exemplary automated chuck having three user selectable operating modes in accordance with the present invention.

In accordance with one aspect of the present invention, the automated chuck 12 includes at least three user selectable operating modes, thereby enabling different functions to be performed during tightening and loosening of the chuck. In an exemplary embodiment, the different operating modes may be selected by rotating an outer sleeve of the chuck as will be further described below. The different operating modes may be demarcated on the outer sleeve as more clearly shown in FIG. 2.

An exemplary automated chuck 12 is further described with reference to FIGS. 3-6. While the following description is provided with reference to a particular chuck configuration, it is readily understood that the broader aspects of the invention are applicable to other chuck configurations.

Figure 3:
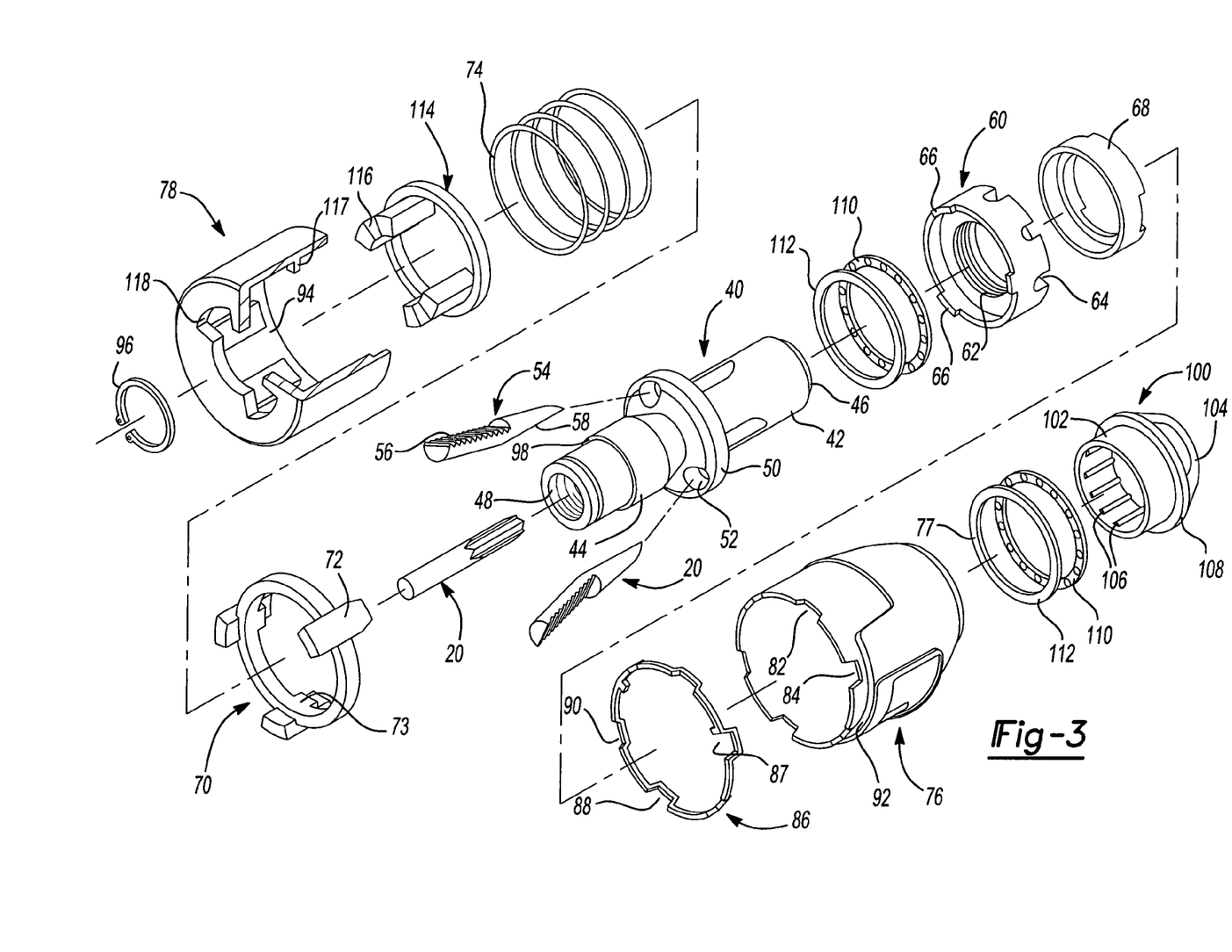
FIG. 3 is an exploded perspective view of an exemplary automated drill chuck according to the principles of the present invention.

The automated drill chuck 12 includes a core body 40 having a forward section 42 and rearward section 44. The forward section 42 includes a through hole 46 that receives a drill bit therein. The rearward section 44 includes threads 48 in the through hole 46 that are adapted to be threadedly engaged with the drive spindle of the drill. The core body 40 includes a collar 50 provided with a plurality of guide channels 52 which intersect the through hole 46 at an angle. A plurality of jaw members 54 are received in the guide channels 52, each jaw member 54 is provided with a threaded surface 56 on the outer side and gripping surface 58 on its forward inner surface. A threaded nut 60 surrounds the core body 40 and includes a tapered threaded surface 62 in threaded engagement with threaded surfaces 56 of jaw members 54. The threaded nut 60 includes a plurality of recesses 64 formed on its forward surface and a number of teeth 66 formed on a rearward surface. A nut cover 68 is axially mounted around the forward section 42 of core body 40 and is in contact with the threaded nut 60.

Figure 4:
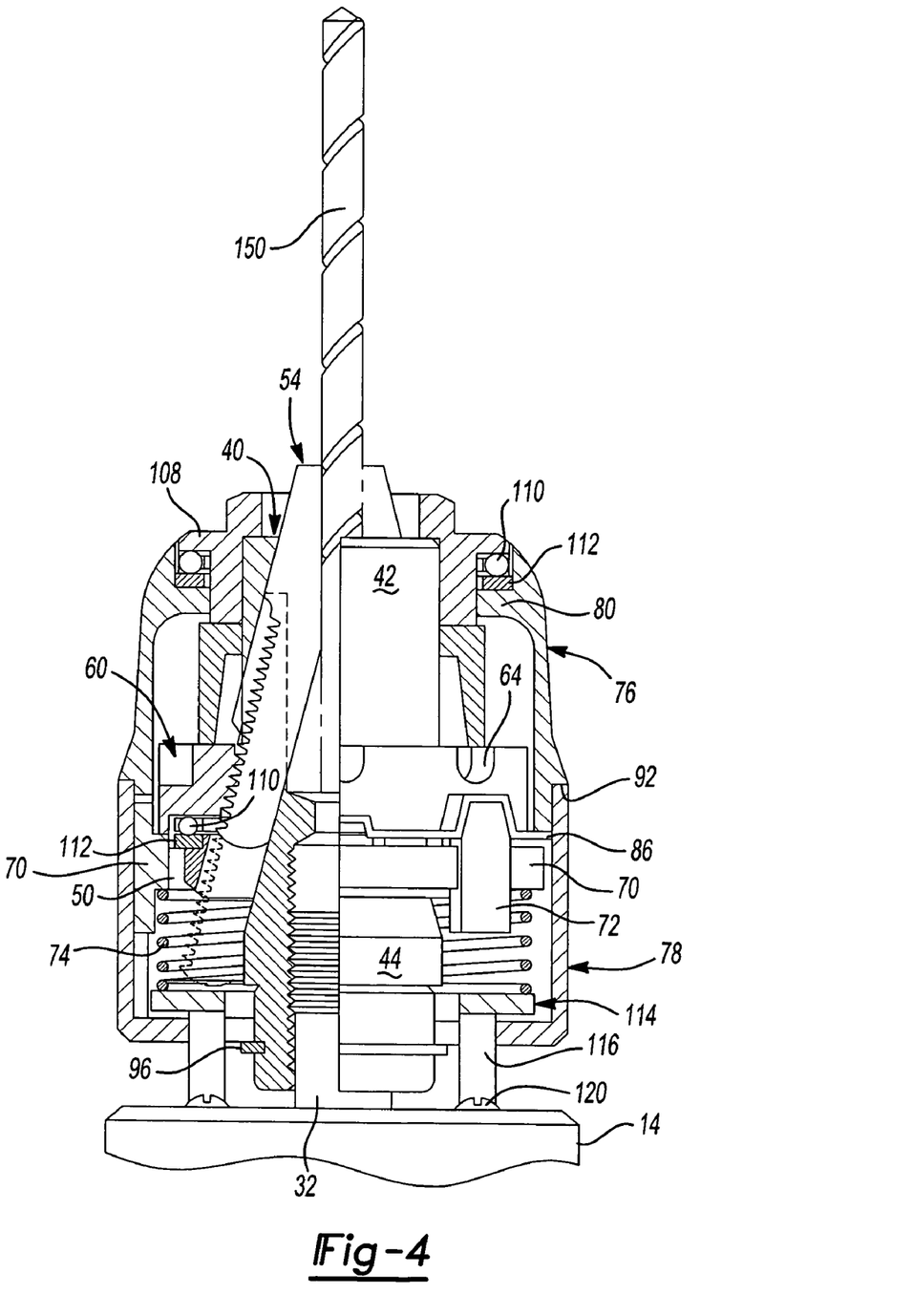
FIG. 4 is a partially sectioned view of the automated chuck according to the principles of the present invention.

An impact ring 70 is ring shaped and embossed with a plurality of tooth-like impact members 73 with sloping sides around its periphery for mating with teeth 66 on threaded nut 60. A coil spring 74 engages the impact ring 70 to flexibly support the rear of the impact ring 70. A forward housing (chuck sleeve) 76 and rearward housing 78 encase the automated drill chuck 12. The rearward housing 78 has forward and rearward openings for insertion of the forward section 42 of core body 40. A locking ring 80 extends radially inward from the inside wall of the forward housing 76, as best shown in FIG. 4. The forward housing 76 also includes a plurality of alternating deep and shallow locking recesses 82, 84 disposed on a rear end thereof. A wear ring 86 is provided with corresponding deep and shallow recesses 88, 90 and is disposed against the rear end of forward housing 76. The deep and shallow locking recesses 88, 90 of the wear ring 86 receive tooth-like members 72 on impact ring 70. The rearward housing 78 covers the rearward end of the forward housing section (chuck sleeve) 76 and engages a stop 92 provided on the outer surface of the forward housing 76 to maintain the axial position of the rearward housing 78 relative to the forward housing 76. The tooth-like members 72 of the impact ring 70 slidably engage axially extending recess channels 94 provided on the inner surface of the rearward housing 78.

The rearward section 44 of the core body 40 is received through the rearward opening of the rearward housing 78 with a locking ring 96 engaging a recessed groove 98 provided on the rear section 44 of the core body 40 for securing the axial position of the rearward housing 78 relative to the core body 40.

A nose sleeve 100 is provided with a rear positioning portion 102 and a forward nose portion 104, with the positioning portion 102 having a cylindrical center through hole and a plurality of positioning ridges 106 raised from the inner wall for engaging the forward section 42 of core body 40. A stop flange 108 is provided around the outer wall that forms a rest surface with the locking ring 80 on the forward housing 76 when the nose sleeve 100 is inserted onto forward section 42 of core body 40.

Bearing rings 110 and washers 112 are provided to rotatably support the forward housing 76. A joint member 114, having a ring shape, is disposed between the coil spring 74 and rearward housing 78. The joint member 114 includes a plurality of joint arms 116 which can be inserted through fan shaped slots 118 and join with bolts 120 on drill housing 14, as best shown in FIG. 4, and are subject to the force from spring 74 and are situated in contact with front end of drill housing 14. It is readily understood that the joint arms may be joined to other features on the front of the drill. In this way, the joint members 114 prevent rotation of the rear housing of the chuck to drill housing.

The operation of the exemplary automated drill chuck 12 is best illustrated by the description of a drill bit 150 being clamped by the chuck 12. As shown in FIG. 4, drill bit 150 is inserted in the center through hole 46 provided in the forward section 42 of the core body 40, with each of the jaw members 54 being retracted sufficiently to allow clearance for the drill bit 150 to be inserted. As the drive spindle 32 rotates in its operational direction, the core body 40 and jaw members 54 rotate therewith. Through the action of the tapered threaded surface 62 of nut member 60 with the threaded surface 56 of jaw members 54, the jaw members 54 instantly incline upwards causing the gripping surface 58 of the jaw members 54 to move toward the axis of rotation and clamp down on the drill bit 150. Nut member 60 does not rotate as it is engaged with the impactor ring 70 which is rotationally fixed by the rear housing 78.

Once the jaw members 54 are prohibited from moving further forward due to the presence of the drill bit 150, the threaded surface 56 and the tapered threaded surface 62 of the nut member 60 join in threaded engagement causing the nut member and core body 40 to rotate simultaneously. The forward housing 76, rearward housing 78, spring 74, and impact ring 70 are joined together as one unit since joint member 114 is engaged to the bolts 120 on the housing 14 and thus, will not rotate along with spindle 32.

Figure 5:
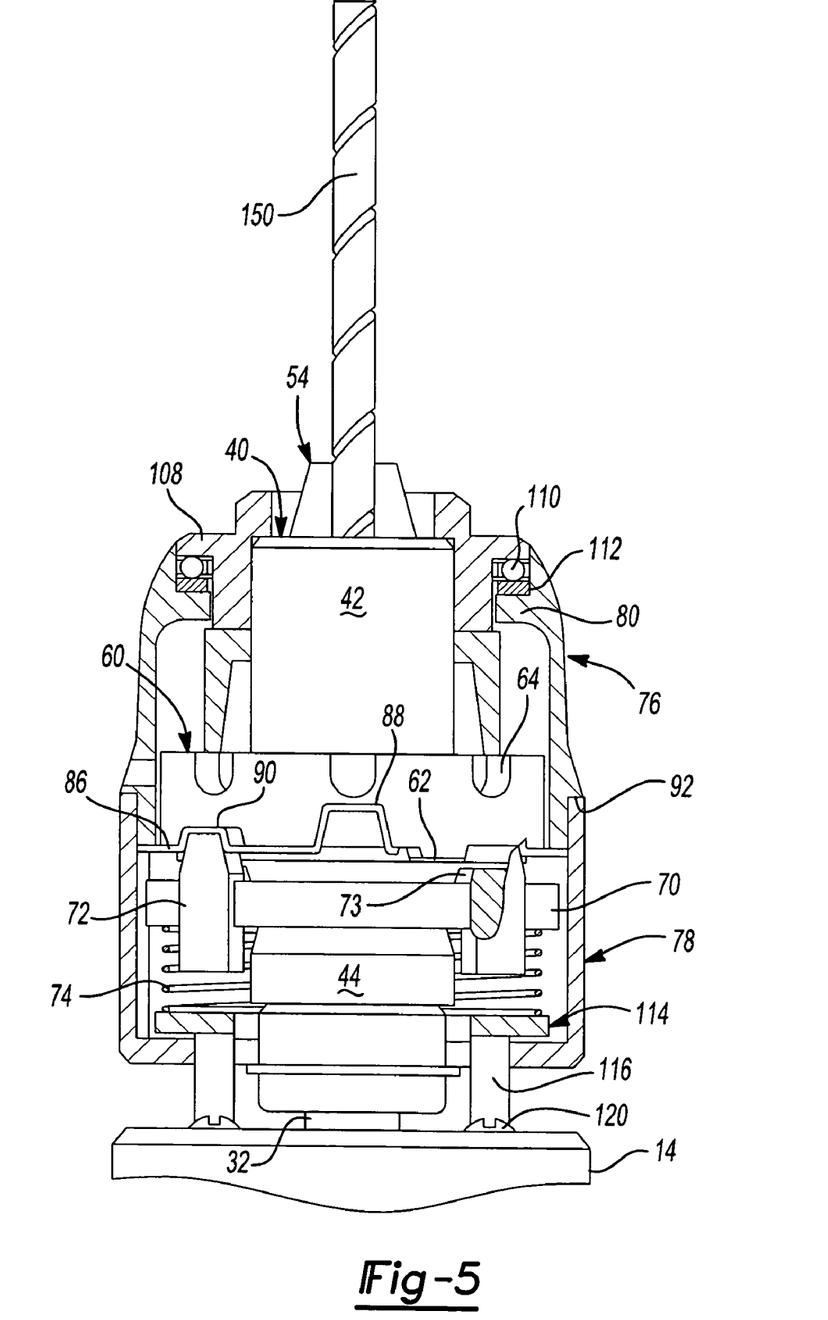
FIG. 5 is a partially sectioned view of the chuck in its normal drilling mode according to the principles of the present invention.

FIG. 5 shows a partial cut-away view of the automated chuck 12 in a drilling mode. By applying rotary force to the forward housing (chuck sleeve) 76, the user adjusts the rotational position and selects the position of engagement between the shallow recesses 90 on wear resistant ring 86 and tooth-like member 72. At this time, the impact ring 70 will be supported by the wear resistant ring 86 and move downward causing impact teeth 73 to disengage from teeth 66 on the nut member 60 causing the nut member 60 to be free of any contact while the nut member 60 is being rotated.

Figure 6:
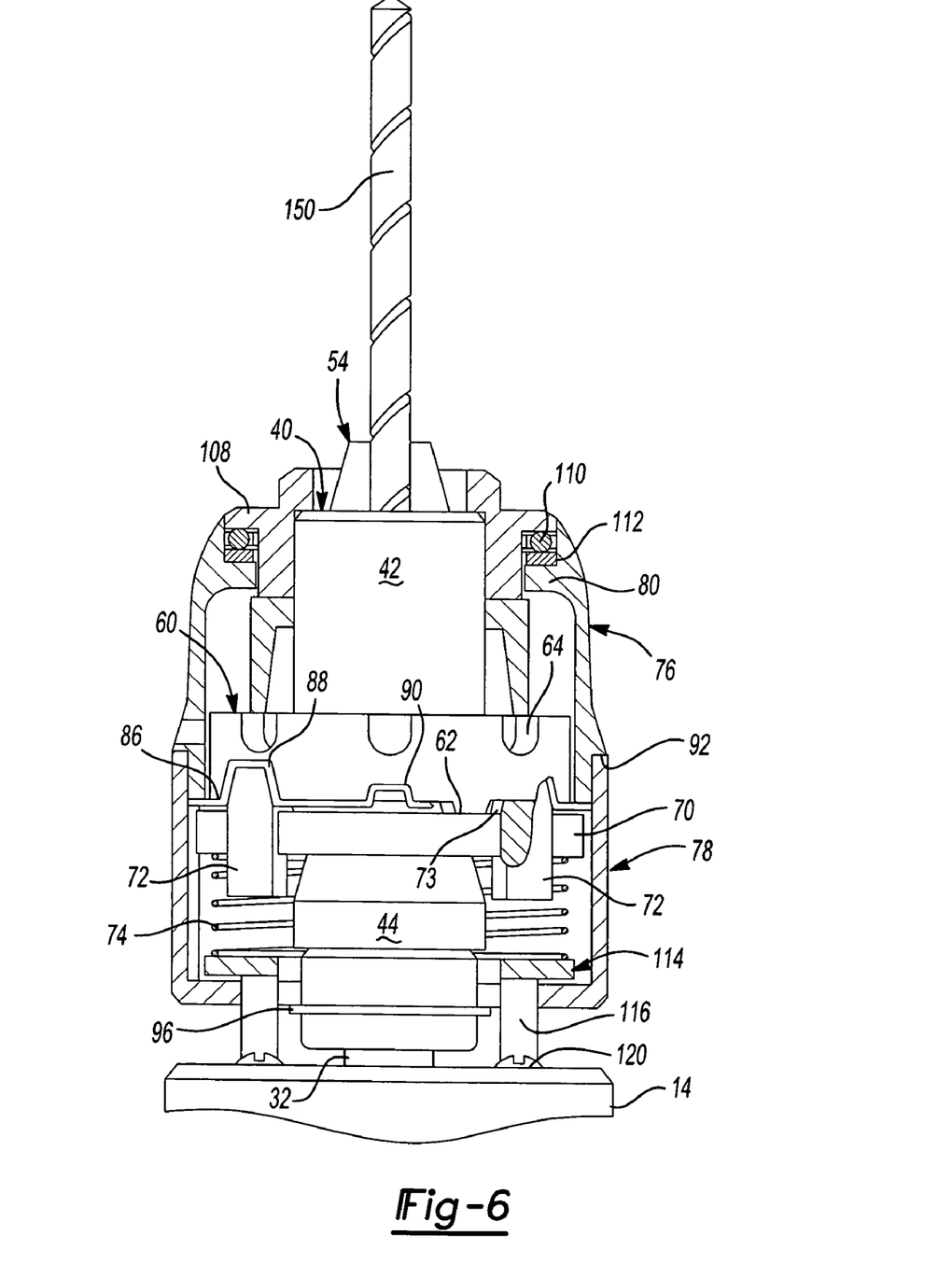
FIG. 6 is a partially sectioned view of the automated chuck in its chuck mode according to the principles of the present invention.

FIG. 6 shows a partial cut-away view of the automated chuck in the "chuck" mode. From the "drill" mode, the chuck sleeve 76 may be rotationally positioned to either a "chuck tightening" mode or a "chuck loosening" mode. To restrict rotation of the chuck sleeve to three selectable positions, end stops 87 are defined on wear ring 86. As the chuck sleeve is rotated, a protruding member 117 defined on an inner surface of the rearward housing 78 engages one of the end stops 87. When actuated to either the "chuck tightening" or "chuck loosening" mode, the end stops 87 are arranged so that the tooth-like members of the impactor ring engage the deep recess of the wear-resistant ring 86. In either of these positions, the automated chuck is considered to be in "chuck mode" where it is capable of tightening and/or loosening a drill bit as described below.

When the drill bit 150 rotates in the operational drilling direction and is subject to significant resistance or where the gripping force around the drill bit 150 is insufficient, the chuck sleeve 76 may be turned during operation or rest so the wear-resistant ring 86 is rotated so that teeth 72 of impact ring 70 engage the deep recesses 88. At this time, the impact ring 70 will move upwards due to the flex action of the spring 74 and while the tooth-like members 72 engage with deep recess 88, impact teeth 73 will simultaneously mesh with teeth 66 on nut member 60 and the rotationally positioned impact ring 70 moves up and down in recessed channels 94 provided in the rearward housing 78 to allow tighter engagement of the threaded surface 62 on nut member 60 with threaded surfaces 56 on jaw members 54, eliminating the gap existing between the threads and increasing the stability of the gripping force of the jaws 54 on the drill bit 150.

The impact ring is able to reciprocate axially against the biasing force of spring 74 so that the impact teeth 73 ride up the sloped sides of the teeth 66 as the torque increases. When the nut member 60 is fully tightened, the impact ring 70 will continue to axially reciprocate as the impact teeth 73 ride upon successive ones of the teeth 60. Removal of the drill bit is obtained by reversing the rotational direction of the motor, thus causing the nut member to be driven in a reverse direction with the impact teeth 73 of the impact ring 70 providing a resistance to the rotation of the nut member 60, thus causing the jaws 54 to retract. In other words, the rotary impact of teeth 66 of nut member 60 with rotationally stationary impact teeth 73 of impact ring 70 tends to cause the nut 70 to tighten or loosen depending upon the direction of rotation of the spindle 32.

As noted above, actuation of the chuck sleeve amongst the different selectable operating modes, enables and/or causes an operation associated with the selected operating mode. For example, the forward housing 76 and the wear ring 86 may employ three sets of recesses, one set of recesses for each selectable position. In this example, a set of recesses having a medium depth is employed for a chuck tightening mode; whereas a different set of recesses having a deeper depth is employed for a chuck loosening mode. As a result, the engagement force between the impacting surfaces is greater in the chuck loosening mode than in the chuck tightening mode. In the drill mode, the applicable set of recesses remains relatively shallow as described above.

Figure 7:
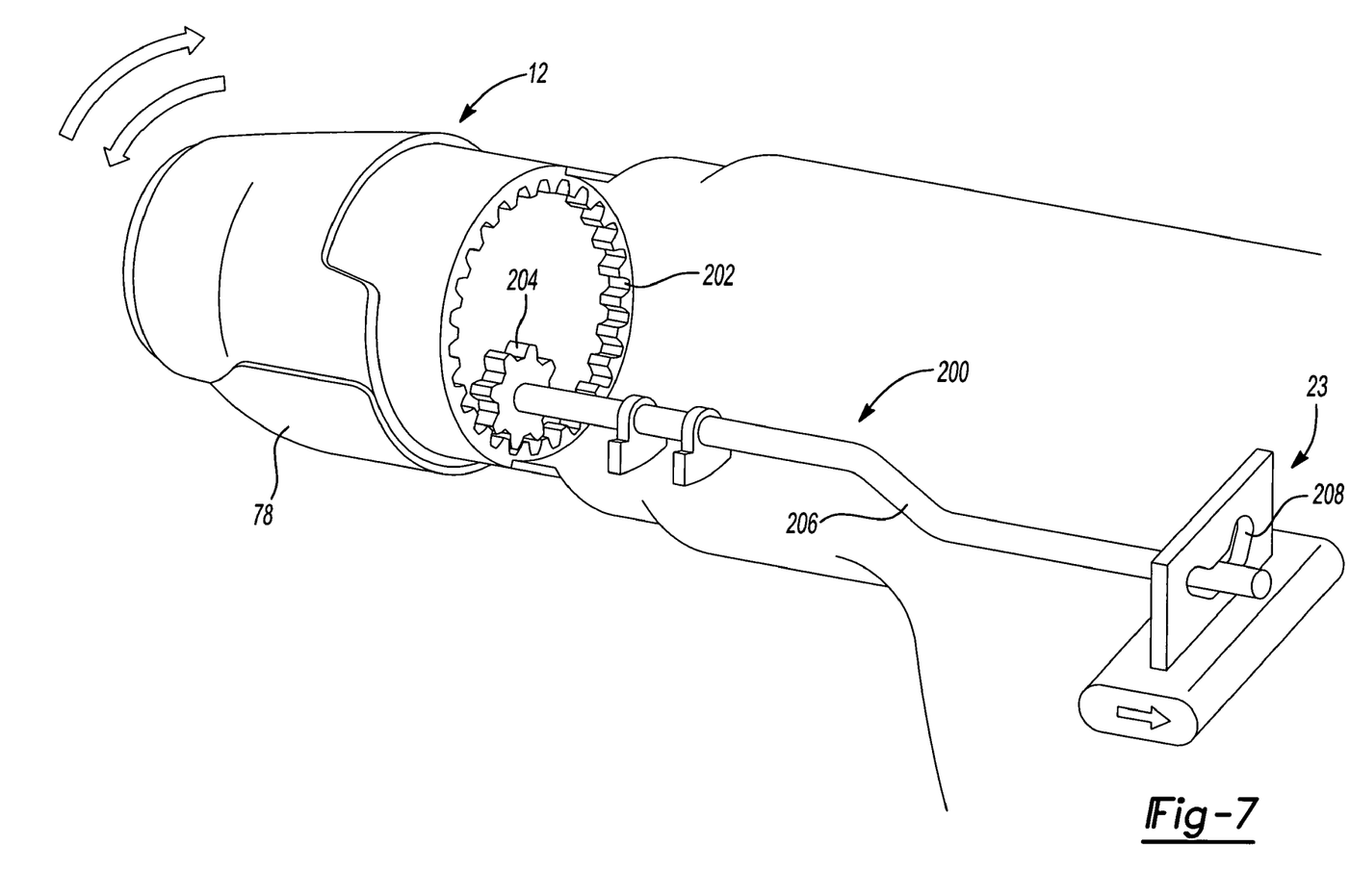
FIG. 7 is a partially section view of the automated chuck interfacing with the motor direction switch of the drill according to the principles of the present invention.

Referring to FIG. 7, the different user selectable operating modes of the chuck 12 may be used to actuate a motor direction switch 23 of the drill. To do so, the outer sleeve 78 of the chuck assembly may be interconnected via a linkage mechanism 200 with the motor direction switch 23. In an exemplary embodiment, a ring gear 202 is formed along an inner surface of the chuck sleeve 78. The linkage mechanism 200 is further defined as a pinion 204 coupled to an end of an actuating rod 206, where the pinion 204 engages the ring gear 202 and the actuating rod 206 passes through a slot 208 formed in the motor direction switch 23.

Figure 8A:
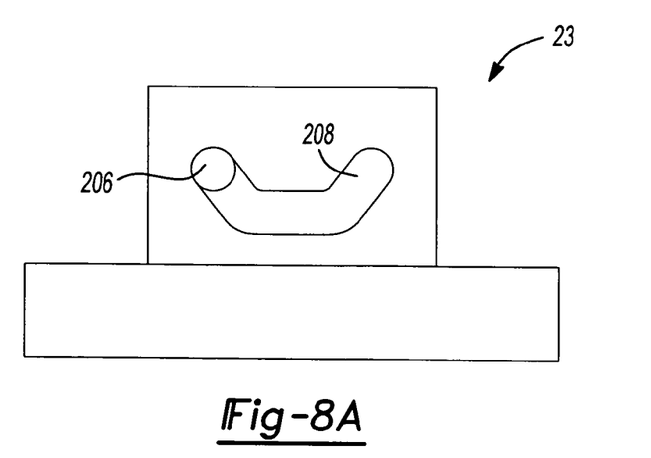
FIGS. 8A-8C illustrate the motor direction switch translated amongst its different positions according to the principles of the present invention.
Figure 8B:
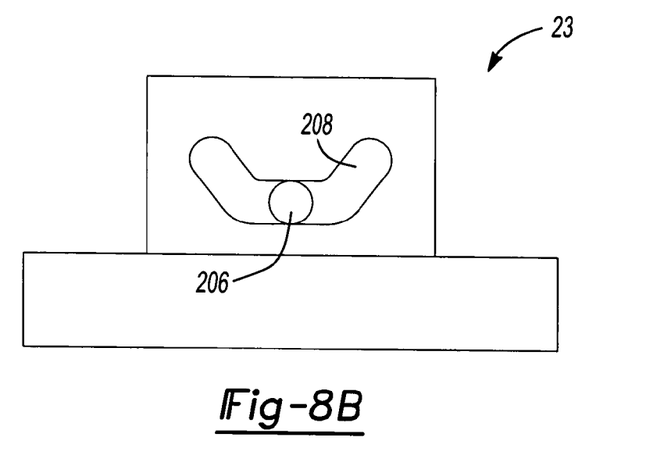
Figure 8C:
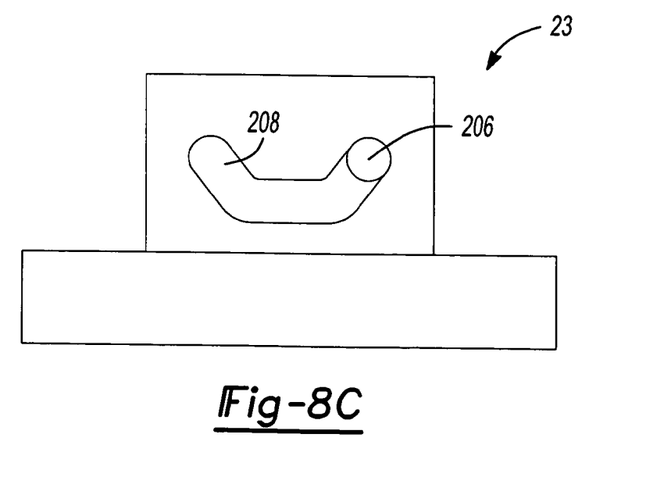

As the chuck sleeve 78 is rotated to select a desired operating mode, the rod 206 is rotated, thereby translating the motor direction switch 23 amongst its different positions. When the chuck sleeve 78 is rotated to a tighten mode, the motor switch 23 is overridden into a forward direction position as shown in FIG. 8A. When the chuck sleeve 78 is rotated to a loosen mode, the motor switch 23 is overridden into a reverse direction as shown in FIG. 8B. In a drill mode, the motor switch 23 is placed in an intermediary position, whereby the user is free to actuate the motor switch to either a forward or reverse direction as shown in FIG. 8C. In comparison with known automated chuck designs, the user is not required to select the proper motor direction, thereby reducing the number of steps to operate the chuck.

It is envisioned that other types of operations may be enabled by the different user selectable operating modes of the chuck. For example, the chuck mode selection mechanism may interact with the transmission of the drill. In an exemplary embodiment, a linkage mechanism interconnects the chuck mode selection mechanism with a user operated shifter lever for the transmission, thereby enabling translation of the lever amongst its different positions. When the chuck is placed in a loosening mode, the drill transmission may be shifted into a high speed mode. When the chuck is placed in a tightening mode, the drill transmission may be restricted to a lower speed mode than is permitted when loosening the chuck, thereby ensuring that the chuck is loosened at a higher speed than it was tightened. Further details regarding an exemplary implementation are described in U.S. patent application Ser. No. 11/354,643 entitled "Drill Chuck Actuator" which is being filed concurrently herewith by the assignee of the present invention and claims priority to U.S. Provisional Patent No. 60/654,849 filed on Feb. 18, 2005. The disclosure of these applications is incorporated herein by reference.

In a different example, different loads may be placed on the spring which biases the impactor ring into engagement with the nut during different chuck operating mode. For instance, a greater load may be placed on the spring when in a chuck loosening mode than in a chuck tightening mode. Different mechanisms for changing the spring load are further described in U.S. Patent U.S. patent application Ser. No. 11/355,386 entitled "Non-Slip Reverse Device for Automatic Chuck" which is being filed concurrently herewith by the assignee of the present invention and claims priority to U.S. Provisional Patent No. 60/654,852 filed on Feb. 18, 2005. The disclosure of these applications is incorporated herein by reference.

In yet another example, the chuck mode selection mechanism may cause different impactor rings to be engaged. During a chuck loosening mode, an impactor ring is engaged which employs less impacting surfaces than the impactor ring which is engaged during a chuck tightening mode, thereby allowing for greater rotational travel and speed between impacts. Further details regarding this example may be found in U.S. patent application Ser. No. 11/357,923 entitled "Drill Chuck" which is being filed concurrently herewith by the assignee of the present invention and claims priority to U.S. Provisional Patent No. 60/655,767 filed on Feb. 24, 2005. The disclosure of these applications is incorporated herein by reference. It is readily understood that two or more of these exemplary operations may be employed in combination. It is also readily understood that other types of operations are within the broader aspects of the present invention.

Figure 9:
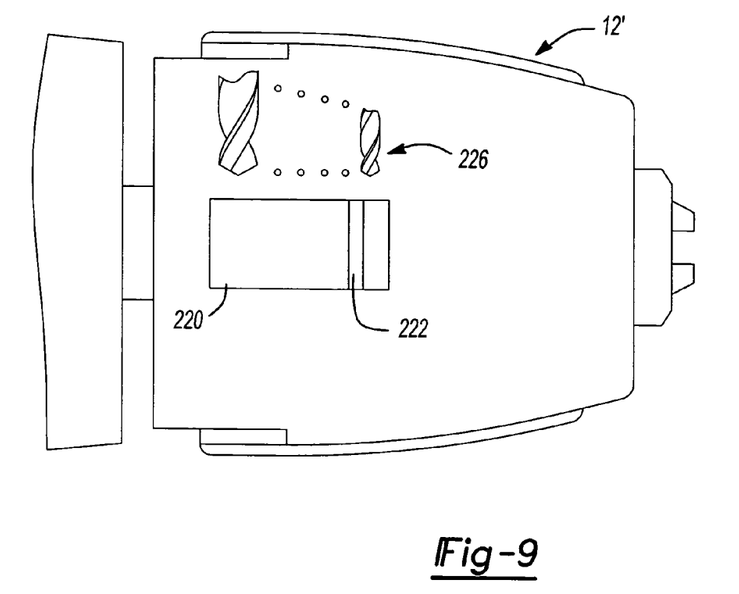
FIG. 9 is a top view of the automated chuck depicting a sightline window for viewing chuck position in accordance with another aspect of the present invention.

To provide the user feedback regarding the position of the chuck jaws, a sightline window 220 may be formed in the sleeve which encases the chuck assembly 12' as shown in FIG. 9. In one exemplary embodiment, the sightline window 220 is preferably sized so that a user can view the entire range of motion of the rearward end of the chuck jaws. However, it is also envisioned that the window is positioned to view the front end of the chuck jaws.

Figure 10:
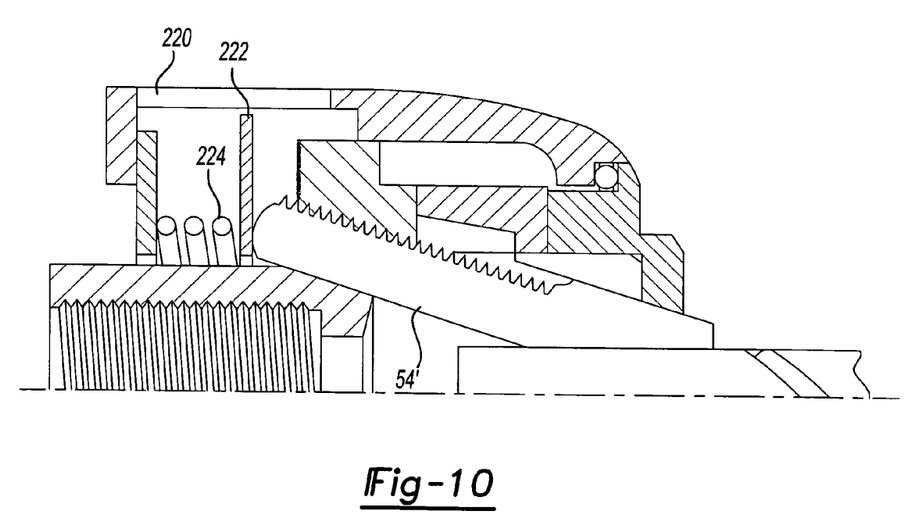
FIG. 10 is a partially section view of the automated chuck having a chuck position indicator according to the principles of the present invention.

To improve viewing, an indicator 222 aligns with the rearward end of the chuck jaws 54'. In this exemplary embodiment, the indicator 222 is biased by a spring 224 against the rear end of at least one jaw as shown in FIG. 10. As the chuck jaws 54' are opened or closed, the indicator 222 moves axially within the rearward sleeve of the chuck assembly, thereby providing an indication of the jaw position. In addition, graphics 226 adjacent to the window 220 correlate the jaw position to a diameter for a bit receptive opening formed by the jaws. It is envisioned that other techniques may be employed for providing an indication of chuck position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A chuck assembly for a rotatable spindle, comprising:
a cylindrical body having a forward section, a collar and a rearward section, the forward section having a center hole formed therethrough, the collar having a plurality of angularly disposed guide channels, and the rearward section being mountable to the spindle;
a plurality of jaws members slidably disposed in the guide channels, each jaw member having a threaded surface formed on an outer side thereof;
a nut disposed about the collar of the body in threaded engagement with the threaded surfaces of the jaw members and rotatable for adjusting a position of the jaw members;
an impactor ring selectably engageable with the nut for transmitting a torque to the nut; and
a mode selection mechanism operable to engage the impactor ring with the nut, the mode selection mechanism having at least two selectable positions in which the impactor ring engages the nut, where the impactor ring transmits a first torque to the nut in a first position of the mode selection mechanism and a second torque, less than the first torque, to the nut in a second position of the mode selection mechanism.

2. The chuck assembly of claim 1 wherein the mode selection mechanism is further defined as a rotatable forward sleeve encasing a forward portion of the chuck assembly, wherein rotation of the forward sleeve changes axial position of the impactor ring in relation to the nut.

3. The chuck assembly of claim 1 further comprises a rearward sleeve encasing a rearward portion of the chuck assembly, where the impactor ring is disposed in the rearward sleeve; and a spring biasing the impactor ring into engagement with the forward sleeve.

4. The chuck assembly of claim 1 wherein the mode selection mechanism enables a chuck tightening mode in the second position and a chuck loosening mode in the first position.

5. The chuck assembly of claim 4 further comprises a motor drivably coupled to the spindle, wherein the mode selection mechanism interconnects with a switch operable to control rotational direction of the motor.

6. The chuck assembly of claim 5 wherein the mode selection mechanism actuates the switch to obtain a forward motor direction when the mode selection mechanism is in the second position and actuates the switch to obtain a reverse motor direction when the mode selection mechanism is in the first position.

7. The chuck assembly of claim 4 further comprises a motor drivably coupled via a transmission to the spindle, wherein the mode selection mechanism interfaces with the transmission to ensure a high motor speed when in the chuck loosening mode.

8. The chuck assembly of claim 1 wherein the mode selection mechanism provides a drill position where the impactor ring is disengaged from the nut.

9. The chuck assembly of claim 1 is incorporated into an electric powered drill.

* * * * *